US006293616B1

(12) United States Patent
Williams et al.

(10) Patent No.: US 6,293,616 B1
(45) Date of Patent: Sep. 25, 2001

(54) MODULAR RAIL FOR ROOF AND WINDSHIELD

(75) Inventors: Bruce Preston Williams, Grosse Point Park; Thomas Scott, Bloomfield Hills, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 30 days.

(21) Appl. No.: 09/693,659

(22) Filed: Oct. 23, 2000

Related U.S. Application Data
(60) Provisional application No. 60/175,325, filed on Jan. 10, 2000.

(51) Int. Cl.[7] .................................. B60J 1/04; B60J 7/00
(52) U.S. Cl. .................. 296/203.01; 296/210; 296/77.1; 296/79; 296/201; 296/96.21; 280/DIG. 5
(58) Field of Search ..................... 296/210, 84.1, 296/77.1, 96.21, 203.01, 203.02, 203.03, 201, 79; 280/DIG. 5

(56) References Cited

U.S. PATENT DOCUMENTS

| 4,336,964 | * | 6/1982 | Pivar ................................. 296/78.1 |
| 4,401,321 | | 8/1983 | Suzuki et al. . |
| 4,906,022 | | 3/1990 | Hira et al. . |
| 5,092,649 | * | 3/1992 | Wurl ........................... 296/203.01 X |
| 5,452,918 | | 9/1995 | Carraway, Jr. . |
| 5,487,564 | | 1/1996 | Fueller et al. . |
| 5,538,310 | | 7/1996 | Frankhouse et al. . |
| 5,590,907 | | 1/1997 | McQueen, II et al. . |
| 5,785,333 | * | 7/1998 | Hinkston et al. .................... 296/77.1 |
| 5,893,603 | | 4/1999 | Viertel et al. . |
| 5,975,615 | * | 11/2000 | Showalter ......................... 296/96.21 |
| 6,003,898 | * | 12/1999 | Teply et al. .................... 296/203.01 X |
| 6,010,182 | * | 1/2000 | Townsend ..................... 296/203.01 |
| 6,012,472 | * | 8/2000 | Wallstrom ..................... 296/203.01 |
| 6,012,767 | | 1/2000 | Farmont . |
| 6,142,253 | * | 11/2000 | Mueller et al. ............. 296/203.01 X |

FOREIGN PATENT DOCUMENTS

| 62-214013 | * | 9/1987 | (JP) ..................................... 296/201 |
| 3239628 | * | 10/1991 | (JP) ..................................... 296/84.1 |
| 624243 | * | 2/1994 | (JP) ..................................... 296/84.1 |
| 640250 | * | 2/1994 | (JP) ..................................... 296/96.21 |
| 6144002 | * | 5/1994 | (JP) ..................................... 296/84.1 |
| 6211042 | * | 8/1994 | (JP) ..................................... 296/84.1 |

* cited by examiner

Primary Examiner—D. Glenn Dayoan
Assistant Examiner—Patricia Engle
(74) Attorney, Agent, or Firm—Damian Porcari

(57) ABSTRACT

A specialty vehicle is provided with first and second rails on opposite lateral sides of the vehicle that extend from the front portion of the vehicle above the passenger compartment to a rear portion of the vehicle. The first and second rails have a plurality of grooves on an inwardly facing side thereof for receiving a windshield, a sun visor and a sun shade in a sliding relationship to permit repositioning. A key hole slot is provided for receiving a seatbelt retractor, grab handle, side view mirror or other accessory on a downwardly facing side of the first and second rails. The sun shade is preferably retained on a roll. The sun shade is a flexible web reinforced by a plurality of longitudinally spaced ribs and a front roof bar. The sun visor may be formed in two parts and retained between a center track and one of the rails. A linearly driven reciprocating windshield wiper is provided on the rails.

16 Claims, 5 Drawing Sheets

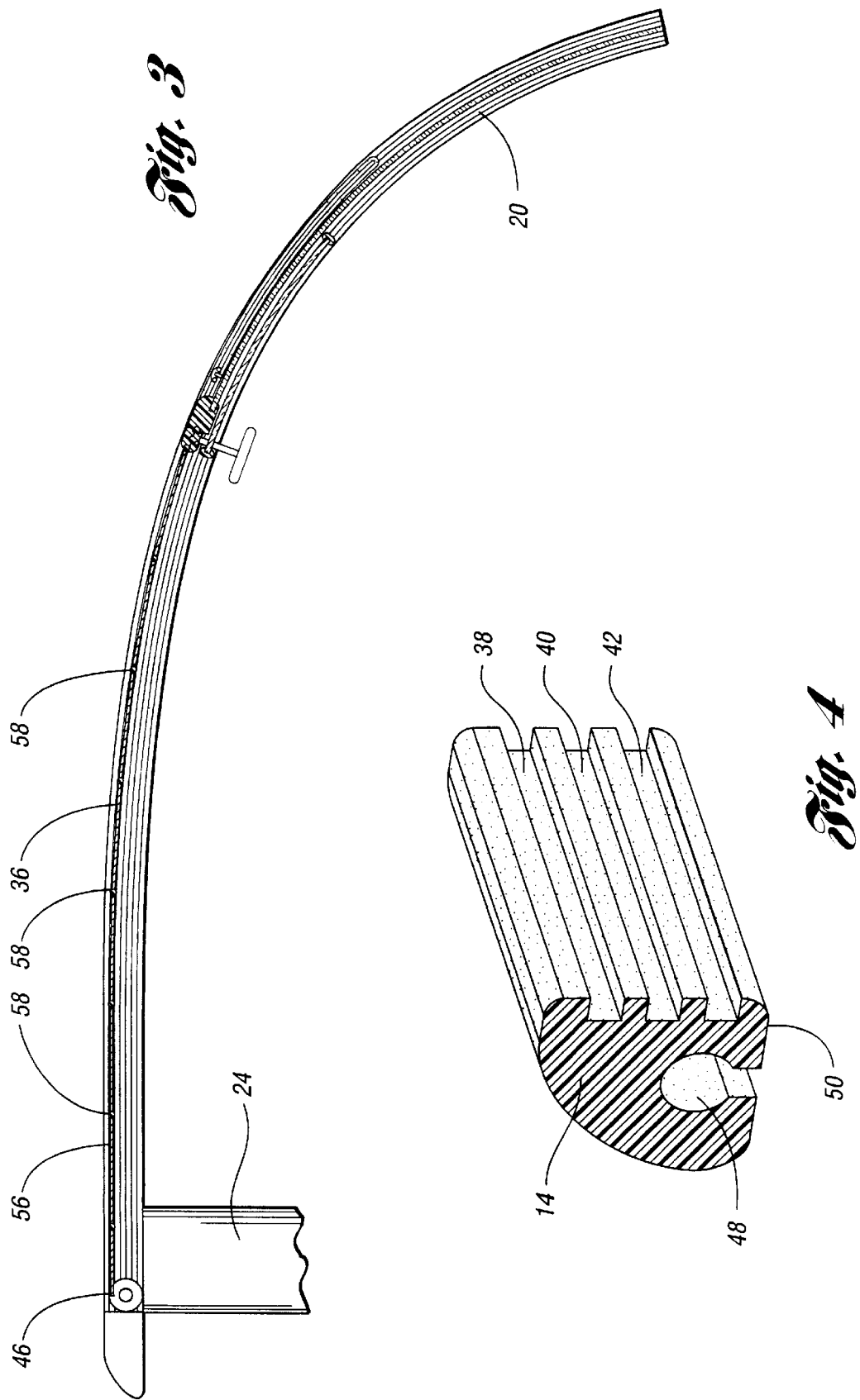

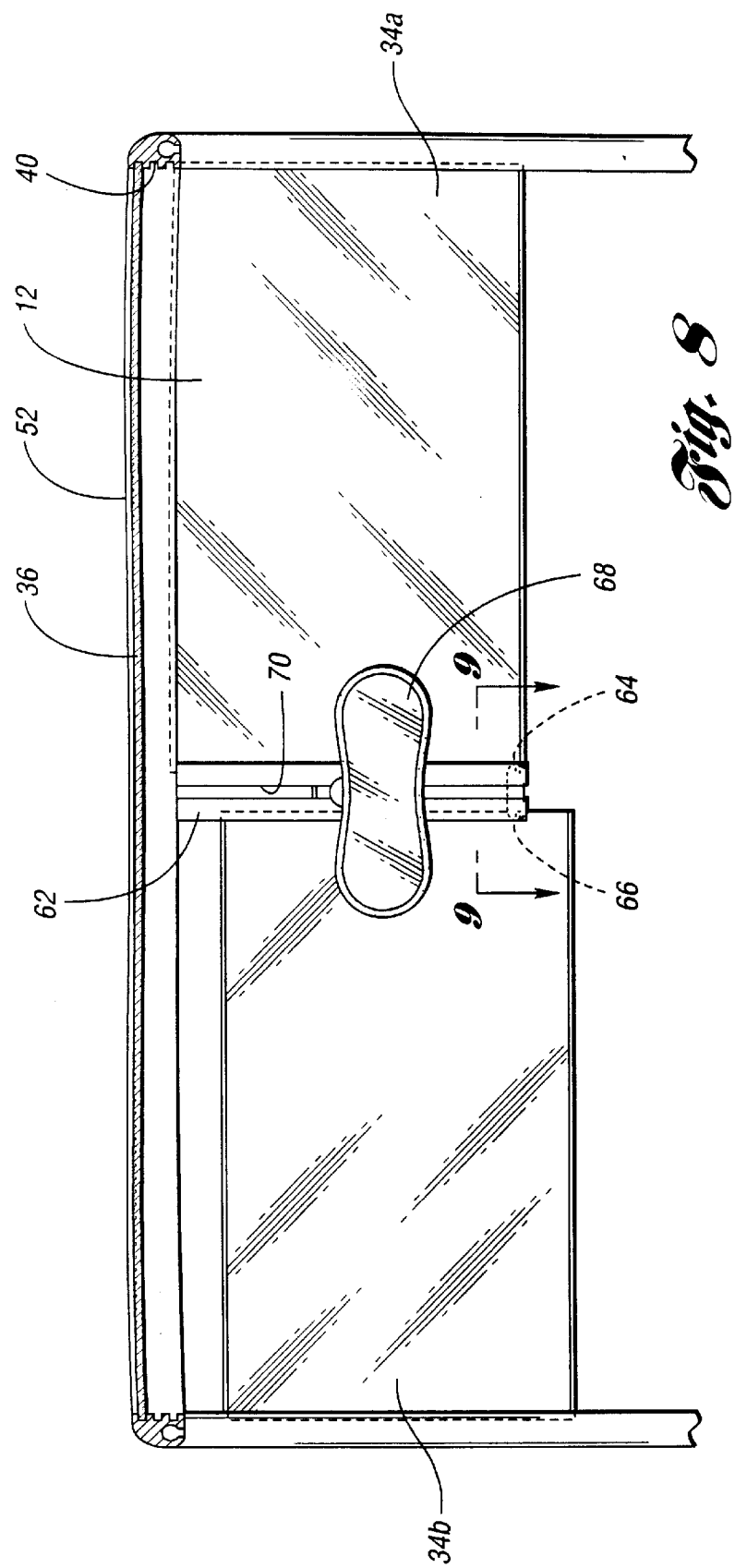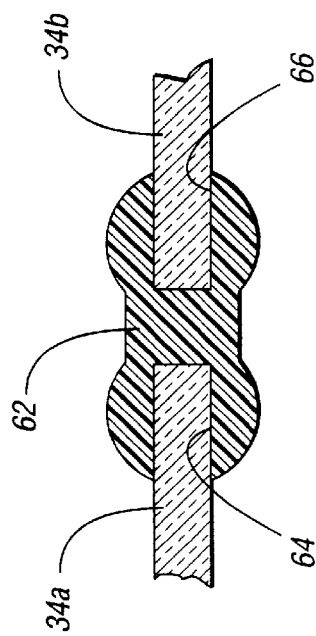

MODULAR RAIL FOR ROOF AND WINDSHIELD

CROSS-REFERENCE TO RELATED APPLICATIONS

This application claims the benefit of U.S. provisional application Ser. No. 60/175,325, filed Jan. 10, 2000.

TECHNICAL FIELD

The present invention relates to a modular rail for a sun visor, windshield and sun shade or other accessories for a speciality vehicle.

BACKGROUND ART

Specialty vehicles such as golfcarts, small utility trucks, and courtesy vehicles generally are not provided with a roof or windshield. Some such vehicles are provided with a fixed rigid roof that is positioned generally over the vehicle. Such vehicles may also be provided with a fixed windshield or a removable windshield that may take the form of a rolled up plastic sheet.

There is a need for a flexible roof and windshield structure that will permit the vehicle to be converted between a roof covered vehicle and a open top vehicle. Further, there is a need to provide a windshield that may be positioned for use as a windshield or repositioned to permit air to flow through the front of the vehicle. The roof and windshield of a specialty vehicle are normally fastened to simple aluminum frame members in a static arrangement. Frames for securing the windshield and roof of a specialty vehicle require substantial assembly operations that are an added cost in vehicle construction.

It would also be advantageous to be able to provide a sun screen to protect occupants of a speciality vehicle from the sun if desired. Sun screens are not generally provided on specialty vehicles.

Another area for improvement for specialty vehicles is to provide an effective windshield wiper.

In the manufacture of speciality vehicles, it is important to minimize weight of all components included in the vehicle to maximize vehicle performance and range. The design of specialty vehicles may also be benefitted by the use of economical extrusions that eliminate manufacturing steps and minimize machining operations necessary to build the speciality vehicle.

These and other problems and disadvantages associated with prior art specialty vehicles are addressed by applicants' invention as summarized below.

DISCLOSURE OF INVENTION

According to the present invention, a modular rail system for a roof and windshield of a vehicle is provided. The modular rail system comprises first and second rails extending on opposite lateral sides of the vehicle from the front portion of the vehicle to the rear portion of the vehicle above the passenger compartment. The first and second rails have at least two groves formed on inwardly facing sides of each rail. A retractable roof web has a pair of side edges that are received by the first grove in each rail. A windshield is received by the second grove in each rail.

The roof, or sun shade, is preferably formed of a fabric or flexible web and is moveable between an extended position wherein it functions as a roof and a retracted position wherein it is rolled on a roller and operates in a manner similar to a window shade. The roof has a plurality of ribs extending transversely across the roof from side to side. The ribs are received in the first grove of each rail. The ribs provide support for the roof when it is in its extended position. Alternatively, a roof panel formed from a rigid sheet of metal or plastic could be provided.

The windshield is preferably shiftable within the track from a position in front of the vehicle occupants to the position wherein space is provided between the dashboard of the vehicle and the bottom of the windshield to provide airflow through the vehicle.

The modular rail system may also include a third grove formed on the inwardly facing sides of each rail in which a sun screen maybe attached. The sun screen preferably has independently moveable right and left panels that permit adjustment of the sunshade within the track to the proper level for occupants of a vehicle who may be of different heights. The sunshade is preferably formed in two separate parts with each part extending from the side of the vehicle to the center of the vehicle. A track is preferably provided in the center of the sunshade so that each part of the sunshade may be independently adjusted.

According to another aspect of the invention, another groove may be formed on a downwardly facing side of each rail that is adapted to receive accessories that may be attached to the rails. Examples of accessories that may be attached to the downwardly facing side of each rail include a seatbelt retractor member, a grab handle and a side mirror.

In accordance with yet another aspect of the present invention, the rails may be formed as extruded aluminum members to minimize machining and assembly operations.

Another aspect of the invention relates to providing a linearly movable windshield wiper that is driven by an endless belt.

These and other objects and advantages of the present invention will be readily understood in view of the attached drawings and following detailed description of the invention.

BRIEF DESCRIPTION OF DRAWINGS

FIG. 3 is an inside side view of the modular rail system for a roof, windshield and sun screen made in accordance with the present invention;

FIG. 4 is a fragmentary perspective view of a section of the modular rail;

FIG. 8 is a fragmentary inside perspective view of a sunshade attached to the modular rail;

FIG. 9 is a cross-sectional view taken along the line 9—9 in FIG. 8;

BEST MODE FOR CARRYING OUT THE INVENTION

Figure 1:
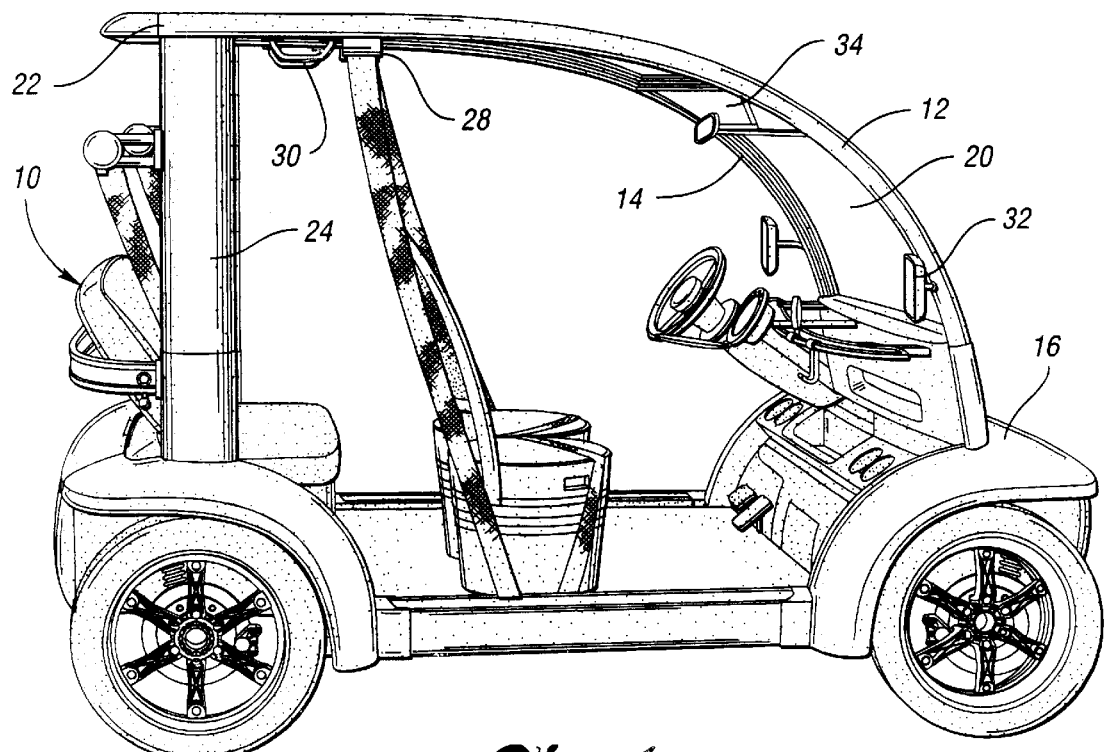
FIG. 1 is a side perspective view of a speciality vehicle having the modular rail system for a roof and windshield of the present invention.
Figure 2:
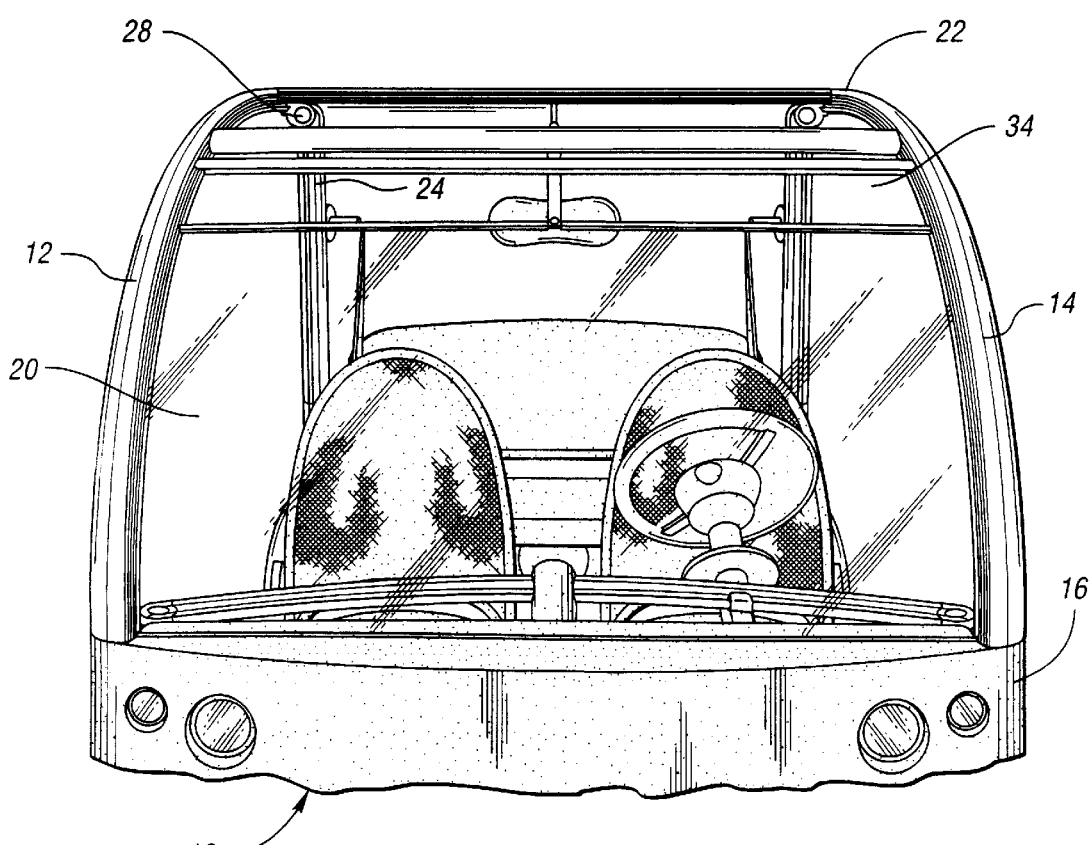
FIG. 2 is a fragmentary front perspective view thereof.
Figure 5:
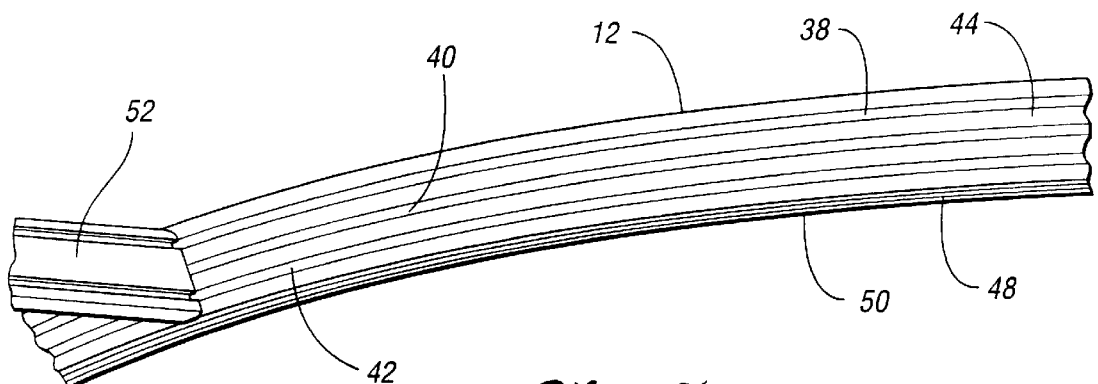
FIG. 5 is a fragmentary inside perspective view of the modular rail system showing a portion of the roof header.

Referring now to FIGS. 1 and 2, especially vehicle 10 having a first rail 12 on the right side of the vehicle and a second rail 14 on the left side of the vehicle. The first and second rails 12, 14 extend from the front portion 16 of the vehicle 10 where they support the windshield 20. The first and second rails, 12, 14 extend from the front portion 16 to a rear portion 22 of the vehicle above the B pillar 24 located near the rear portion 22 of the vehicle 10 and above the passenger compartment.

The first and second rails 12, 14 may be used to support a seatbelt retractor 28, a grab handle 30, and side view mirrors 32. The rails 12, 14 also support the windshield 20, a sun visor 34 and a sun shade 36.

Referring now to FIGS. 3–6, each rail includes a first groove 38, a second groove 40, and a third groove 42 on an inwardly facing side 44 of each of the first and second rails 12, 14. The sun shade 36 is supported in the first groove 38. The sun visor 34 is supported by the second groove 40 and the windshield 20 is supported by the third groove 42. The windshield 20 is preferably formed of lexan, polycarbonate, or laminated glass.

The sun shade 36 is preferably a fabric web that may be retained on a roll 46 or extended from the roll over the passenger compartment of the vehicle 10 in the manner of a retractable window shade as will be more fully described below.

Figure 6:
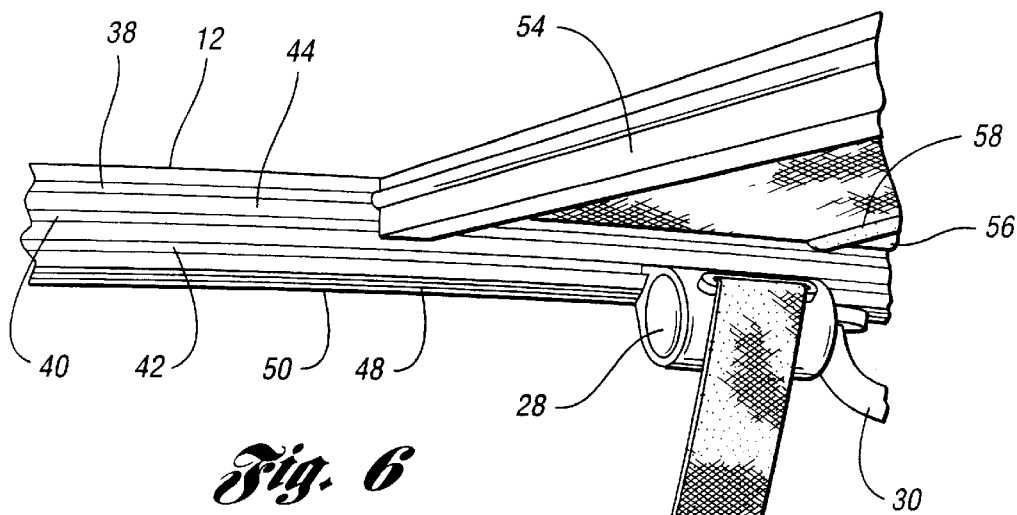
FIG. 6 is a fragmentary inside perspective view showing the roof partially deployed and a seatbelt retractor.
Figure 7:
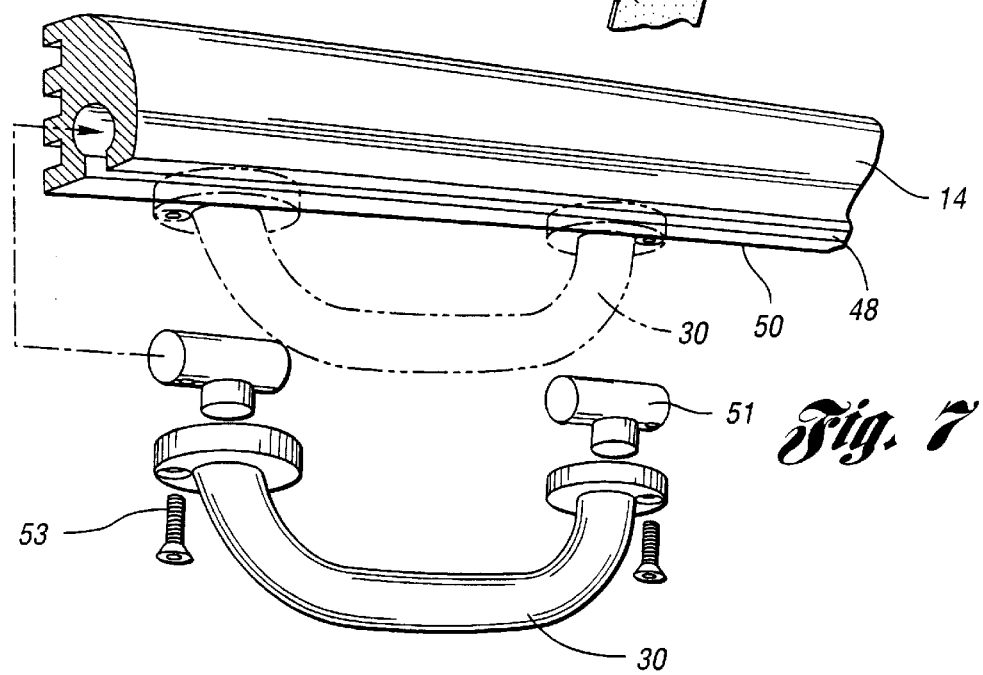
FIG. 7 is a fragmentary perspective view showing a grab handle attached to the modular rail.

As shown best in FIGS. 4–7, a key hole slot 48 is formed in a downwardly facing side 50 of each of the first and second rails 12, 14. The key hole slot 48 is provided to mount seatbelt retractor 28, grab handle 30, or side view mirror 32 on the downwardly facing side 50 of the first and second rails 12, 14. As shown in FIG. 7, the grab handle or other accessory has a cylindrical anchor 51 that is received in the key hole slot 48 and secured by fasteners 53. A header 52, shown in FIG. 5, extends between the first and second rails 12, 14.

Referring now to FIGS. 3 and 6, a front roof bar 54 is secured to the leading edge of the roof web 56. A plurality of ribs 58 extend between the first and second rails 12, 14 to support the roof web 56 at longitudinally spaced points on the roof web 56.

Referring now to FIG. 8, the structure of the sun visor 34 of the present invention is shown in greater detail. The sun visor 34 may be divided into two parts 34a and 34b that are preferably formed of a green or gray tinted translucent plastic material such as lexan, polycarbonate, or laminated glass. A center track 62 is secured to the header 52 and extends perpendicularly downwardly from the header 52. The center track has first and second outwardly oriented slots 64, 66. Sun visor 34a is movably disposed within the first outwardly oriented slot 64 and the second groove 40 so that it may be slidably repositioned. Sun visor 34b is slidably disposed in the second outwardly oriented slot 66 and the second groove 40 of the second rail 14. A rearview mirror 68 may be positioned in a slot 70 formed on the inner surface of the center track 62 or may be fixedly attached to the center track 62.

Referring now to FIG. 9, the relationship of the center track 62 and two parts of the sun visor 34a, 34b, is shown in cross section.

Figure 10:
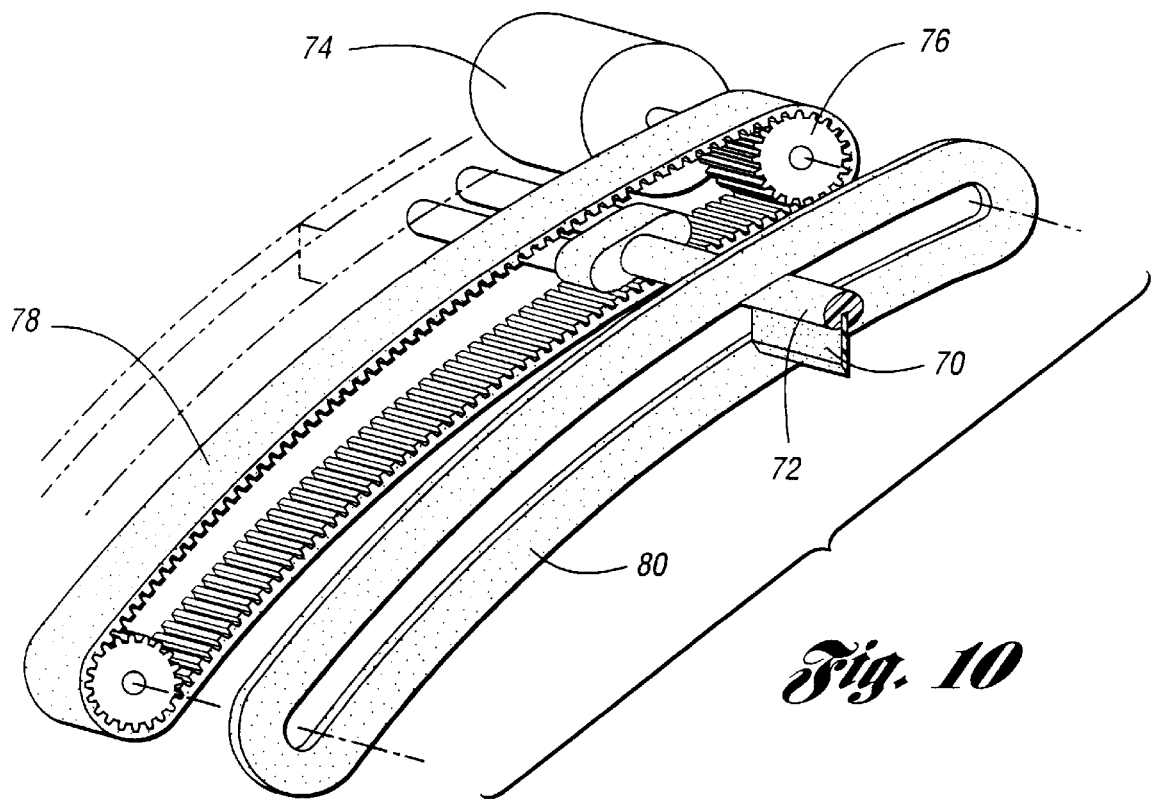
FIG. 10 is a fragmentary perspective view of a windshield wiper and wiper drive made in accordance with the present invention.
Figure 11:
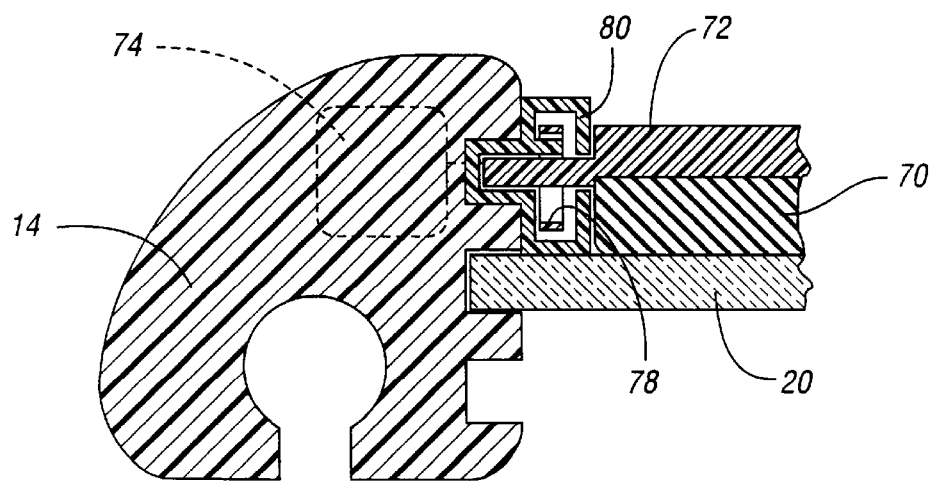
FIG. 11 is a fragmentary cross-sectional view of a rail and wiper drive made in accordance with the present invention.

Referring to FIGS. 10 and 11, a wiper 70 is retained by a wiper bar 72 for vertical linear movement to wipe the windshield 20. The wiper bar 72 is driven by a motor 74 that turns a pinion gear 76 which in turn drives a drive belt 78. A mounting block 80 is secured to the wiper bar 72 and is moved by the belt 78 in a reciprocating path as the motor 74 reverses its direction of rotation as the wiper 70 approaches the ends of the drive belt 78. A guide 80 is attached adjacent one side of the drive belt 78 to guide movement of the wiper 70.

While the best mode for carrying out the invention has been described in detail, those familiar with the art to which this invention relates will recognize various alternative designs and embodiments for practicing the invention as defined by the following claims.

What is claimed is:

1. A modular rail system for a roof and a windshield of a vehicle comprising:

first and second rails extending on opposite lateral sides of the vehicle from the front portion of the vehicle to the rear portion of the vehicle, the first and second rails have at least first and second grooves formed on inwardly facing sides of each rail;

a roof panel has a pair of side edges that are received by the first groove in each rail;

a windshield has a pair of side portions that are received by the second groove in each rail.

2. The modular rail system of claim 1 further comprising a key hole slot formed on a downwardly facing side of each rail that is adapted to receive an attachment to the rails.

3. The modular rail system of claim 2 wherein the attachment is a seat belt retractor.

4. The modular rail system of claim 2 wherein the attachment is a grab handle.

5. The modular rail system of claim 2 wherein the attachment is a side view mirror.

6. The modular rail system of claim 1 wherein the windshield is slidable in the second groove.

7. The modular rail system of claim 1 wherein the rails are extruded aluminum members.

8. The modular rail system of claim 1 wherein a third groove is provided on the inwardly facing sides of each rail and a sun shade is inserted in the third groove.

9. The modular rail system of claim 8 wherein the sunshade is formed in two parts and wherein a center track is provided that has outwardly oriented slots, the center track being mounted perpendicular to a header extending between the first and second rails, each of the two parts of the sunshade being independently moveable in one of the third grooves and in one of the slots of the center track.

10. The modular rail system of claim 1 wherein the roof is slidable in the first groove.

11. The modular rail system of claim 10 wherein the roof panel is a flexible web that is retained on and extensible from a roll.

12. The modular rail system of claim 11 wherein the flexible web is supported by a plurality of transversely extending ribs.

13. The modular rail system of claim 11 wherein the roof panel is supported on a forward edge by a front roof bar.

14. The modular rail system of claim 12 wherein the flexible web is supported on a forward edge by a front roof bar.

15. The modular rail system of claim 1 further comprising a windshield wiper and wiper drive for driving the wiper in a linear reciprocating path.

16. The modular rail system of claim 15 wherein the wiper drive is a motor and a motor driven belt that is connected to a wiper bar that supports the wiper.

* * * * *